United States Patent Office 3,740,402
Patented June 19, 1973

3,740,402
CERTAIN 2-(o-SULFONAMIDOPHENYL)-4
(3H)-QUINAZOLINONES
Albert Anthony Cevasco, Middlesex, N.J., assignor to
American Cyanamid Company, Stamford, Conn.
No Drawing. Filed Mar. 1, 1971, Ser. No. 119,964
Int. Cl. C07d 51/48
U.S. Cl. 260—256.5 R                    6 Claims

ABSTRACT OF THE DISCLOSURE

Flourescent compositions which are not visible under ordinary light, said compositions having organic quinazolone compounds as the fluorescent component.

This invention relates to fluorescent compositions containing a quinazolone compound of Formula I as the luminescer, to a process for the manufacture of the quinazolone compound, and to the use of the fluorescent compositions on surfaces.

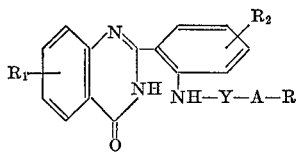

I

This invention also relates to fluorescent quinazolone compounds of Formula II as new compounds.

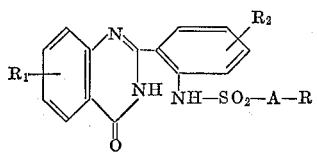

II

In Formulas I and II, R is hydrogen, alkyl of 1–4 carbons or alkoxy of 1–4 carbons; $R_1$ and $R_2$ are hydrogen, alkyl of 1–4 carbons, alkoxy of 1–4 carbons or halogen; A is alkylene of 1–18 carbons or arylene (phenylene, naphthylene); and Y is sulfonyl (—$SO_2$—) or carbonyl (—CO—).

The following class of quinazolone compounds is known to be fluorescent:

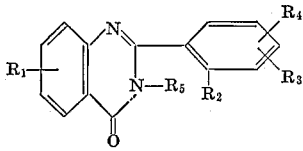

III from U.S. Pats. 3,169,129, 3,269,955 and Re. 26,565.

In Formula III, $R_1$, $R_2$, $R_3$ and $R_4$ are hydrogen, hydroxyl, and alkyl or alkoxy of 1–4 carbons; and $R_5$ is hydrogen or an alkyl of 1–4 carbons. The preferred subclass is that in which $R_2$ is hydroxyl. This class of compounds is preferred of all compounds of Formula III because of the relative intensity of luminescence and the superior light stability of 2-(2-hydroxyphenyl)quinazolones.

The above cases and patents can be consulted for background information on luminescers and their use.

It was pointed out in the above patents, that there is a need for suitable fluorescent organic materials which (1) exhibit little or no visible color in white light, (2) fluoresce strongly in the solid state when irradiated by ultraviolet light, and (3) are adequately stable to the effect of such irradiation and to the effect of heat for an extended period.

Furthermore, depending to some degree on the use intended for the fluorescent materials, the material should have additional desirable physical properties. These include:

(1) Thixotropy, i.e., the formation of gel-like suspensions when the material is dispersed in a solvent and allowed to stand. This property is valuable in certain paint formulations where "no-drip" paints are desired.

(2) Dispersibility, i.e., ability to form stable dispersions, particularly in aqueous systems, with the need for little or no dispersing agent.

(3) Low bulk density, i.e., high volume per unit of weight. This property permits the preparation of inks containing less than normal amounts of fluorescent material without sacrifice of rheological properties.

(4) Rub resistance, i.e., the ability of inks containing the fluorescent agents to resist scuffing and smearing when applied to a substrate and subjected to rubbing.

It has now been discovered that fluorescent materials of Formula I have the above-described desirable properties to a degree previously unobtainable. The members of this class of luminescers (1) are strongly fluorescent in the solid state when irradiated with ultraviolet light, (2) have little or no visible color (less than the luminescers of the above patents), (3) are easily dispersed, especially in aqueous systems, with the use of little or no dispersing agent to form stable dispersions (more stable to settling than similar dispersions of the luminescers of the above patents), (4) are thixotropic in solvents (more thixotropic than luminescers of the above patents), (5) have low bulk density (less than the luminescers of the above patents), and (6) rub-ressistant in inks (more rub-resistant than ink containing the luminescers of the above patent).

The quinazolones of Formula I are obtained by the reaction of a corresponding benzoxazinone of Formula IV with ammonia. The reaction can be illustrated by the following scheme:

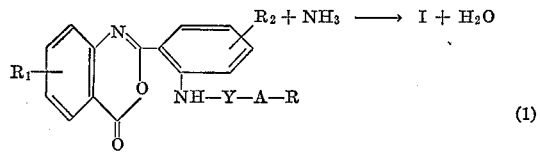

IV (1)

The compounds of Formula II are resistant to hydrolysis of the sulfonyl radical from the amino group. The compounds of Formula I where Y is a carbonyl group undergo hydrolysis in acidic or basic media to form a free amino group. Acidic or basic conditions may be present in the above-mentioned compositions. Therefore, the compounds of Formula II have an unexpected advantage over compounds of Formula I where Y is a carbonyl group.

There are at least two known methods for preparing the benzoxazinones of Formula IV. In the first method, an anthranilic acid is reacted with an acyl halide in accordance with the procedure of French Pat. 1,392,448. In the second method, an N-anthraniloylanthranilic acid is reacted with an acyl halide in accordance with the procedure of Tr. Vses Nauchm.-Issled Inst. Khim. Reactivov i Osobo Christykh Khim. Veshchesto No. 27, 289 (1965).

Representative anthranilic acids of use in the first method or of use in preparing the N-anthraniloylanthranilic acid of the second method include alkylanthranilic acids such as 3-,4-,5- and 6-methylanthranilic acids, 3-,4-,5- and 6-ethylanthranilic acids, 4-propylanthranilic acid, 4- and 5-butylanthranilic acids, etc.; alkoxyanthranilic acids such as 3-, 4-, 5- and 6-methoxyanthranilic acids, 4-ethoxyanthranilic acid, etc.; and haloanthranilic acids such as 3-, 4-, 5- and 6-chloroanthranilic acids, 4-, 5-, 6-bromoanthranilic acids, 3-, 4-, 5- and 6-fluoroanthranilic acids, 3-, 5- and 6-iodoanthranilic acids, etc.

Representative acyl halides of use in either the first or second method for preparing benzoxazinones include alkanoyl halides such as acetyl chloride, acetyl bromide, acetyl iodide, acetyl fluoride, propionyl chloride, octanoyl chloride, 2-butyloctanoyl chloride, methoxyacetyl chloride, ethoxyacetyl chloride, etc.; aroyl halides such as benzoyl chloride, benzoyl bromide, benzoyl fluoride, benzoyl iodide, o-, m- and p-toluoyl chlorides, o-ethylbenzoyl chloride, o - propylbenzoyl chloride, p - butylbenzoyl chloride, anisoyl chloride, o- and p-ethoxybenzoyl chlorides, p-propoxybenzoyl chloride, p-butoxybenzoyl chloride, 1-naphthoyl chloride, 2-naphthoyl chloride, and 1-methyl-2-naphthoyl chloride, etc.; aralkanoyl halides such as phenylacetyl chloride, 2-naphthylpropionyl bromide, p-ethoxyphenylacetyl fluoride, etc.; alkane sulfonyl halides such as methanesulfonyl chloride, methanesulfonylbromide, methanesulfonyl fluoride, ethanesulfonyl chloride, octanesulfonyl chloride, 2-methoxyethanesulfonyl chloride, etc.; and arene sulfonyl halides such as benzenesulfonyl chloride, benzenesulfonyl bromide, benzenesulfonyl fluoride, o-, m- and p-toluenesulfonyl chlorides, p-ethylbenzenesulfonyl chloride, o-, m- and p-methoxybenzenesulfonyl chlorides, p-ethoxybenzenesulfonyl chloride, p-propoxybenzenesulfonyl chloride, p-butoxybenzenesulfonyl chloride, p-bromobenzenesulfonyl chloride, 1-naphthalenesulfonyl chloride, 2-naphthalenesulfonyl chloride, 4 - methoxy - 1 - naphthalenesulfonyl chloride, etc.

The reaction of the benzoxazinone with ammonia (Scheme 1) is conveniently carried out in an inert water-miscible organic solvent in the presence of an alkali metal hydroxide, such as sodium hydroxide. The ammonia can be used as aqueous ammonia or as gaseous ammonia and should be employed in excess over theory, preferably at least ten moles per mole of benzoxazinone. A reaction temperature between 80° C. and the reflux temperature is recommended. The reaction is continued until essentially all of the benzoxazinone has been consumed. The reaction mixture is then acidified and the quinazolone product separated by filtration.

Representative organic solvents include pyridine, methyl Cellosolve, Cellosolve, ethylene glycol, etc.

The success of this procedure for converting 2-(2-acylaminophenyl)benzoxazinones (Formula IV) to the corresponding quinazolones (Formula I) is very surprising in view of the statement in J. Org. Chem. 14, 967 (1949) that an o-substituent on a phenyl group attached to benzoxazinone at the 2-position prevents the formation of a quinazolone when the substituted benzoxazinone is heated with ammonia.

The luminescent compounds of Formula I are highly useful in applications requiring emission of visible light on exposure to ultraviolet light. They may be formulated successfully in solid form in screens, films, coatings and the like, to obtain the fluorescent effects desired.

The compounds of this invention may be used in a very large variety of applications based on the solid state fluorescence and stability of the compounds. Thus, for example, they may be used in lighting panels; various types of plastic compositions; in inks, paints and the like; or in any application applied to a surface or in a film for emission of visible light upon exposure to ultraviolet light. A specific application of interest is the use of a fluorescent compound of the invention in printing inks, paints, enamels and other surface coating compositions to produce a composition which has one appearance by daylight and a completely different appearance or color under ultraviolet or black light. Such effects are useful for various decorative uses and for purposes of identification or security.

As fluorescers, compounds of the invention absorb ultraviolet light and by virtue of this property also have application as protective agents in plastic compositions, i.e., as ultraviolet absorbers. In such cases, it is the ultraviolet absorbing property which is important rather than conversion of incident ultraviolet light to emitted visible light.

The following specific examples are set forth to illustrate the invention and represent various specific embodiments thereof. The examples are not intended to limit the scope of the invention.

EXAMPLE 1

Preparation of 2-[-(p-toluenesulfonamido)phenyl]-4H-3,1-benzoxazin-4-one

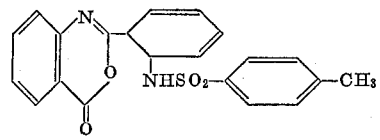

A solution of 76.8 g. (0.40 mole) p-toluenesulfonyl chloride in 100 ml. pyridine was added dropwise at ambient temperature to a solution of 27.4 g. (0.20 mole) anthranilic acid in 50 ml. pyridine. The solution was heated on a steam bath for 2 hours and cooled. The precipitate was separated by filtration, washed with 50 ml. pyridine, 50 ml. acetone, and 100 ml. 1:1 mixture of acetone and concentrated hydrochloric acid. The product, when washed acid-free with water and with methanol and dried, melts at 217–219° C. After recrystallization from methylene chloride-hexane, the product melts at 221.5–223° C.

EXAMPLE 2

Preparation of 2-[2-(p-toluensulfonamido)phenyl]-4(3H)-qunazolinone

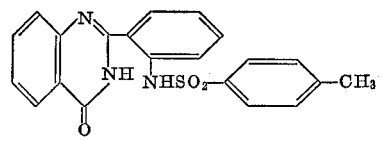

A solution of 200 ml. concentrated ammonium hydroxide and 11.3 g. 2-[2-(p-toluenesulfonamido)phenyl]-4H-3,1-benzoxazin-4-one (Product of Example 1) in 75 ml. methyl Cellosolve was stirred at 20–25° C. for 1 hour and treated with a solution of 2.0 g. sodium hydroxide in 10 ml. water. The solution was refluxed for 2 hours and cooled. The precipitate obtained by acidification of the solution with dilute acetic acid was separated by filtration, washed with water and with ethanol and dried. The product, after recrystallization from o-dichlorobenzene-hexane, melts at 279–281° C. and in the solid state exhibits peak fluorescence at 520 nm. when irradiated with UV light (360 nm.).

Calcd. for $C_{21}H_{17}N_3SO_3$ (percent): C, 64.43; H, 4.34. Found (percent): C, 64.02; H, 4.13.

EXAMPLE 3

Preparation of 2-(2-benzenesulfonamidophenyl)-4H-3,1-benzoxazin-4-one

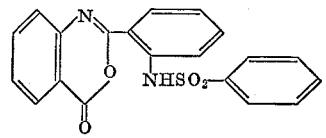

A solution of 56.5 g. (0.32 mole) benzenesulfonyl chloride in 100 ml. pyridine was added to a solution of 27.4 g. (0.20 mole) anthranilic acid in 50 ml. pyridine. The mixture was stirred at ambient temperature for 24 hours. The precipitate was separated by filtration, washed with ethanol and dried. The product melts at 217–218.5° C.

EXAMPLE 4

Preparation of 2-(2-benzenesulfonamidophenyl)-4(3H)-quinazolinone

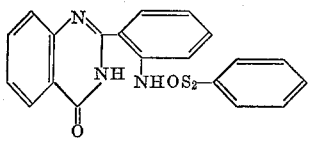

The procedure of Example 2 was employed, substituting 2-(2 - benzenesulfonamidophenyl)-4H-3,1-benzoxazin-4-one (product of Example 3) in place of 2-[2-(p-toluenesulfonamido)phenyl] - 4H - 3,1 - benzoxazin-4-one. The product melts at 282–283.5° C. and exhibits a solid state fluorescence peak at 520 nm.

EXAMPLE 5

Preparation of 2-(2-methanesulfonamidophenyl)-4H-3,1-benzoxazin-4-one

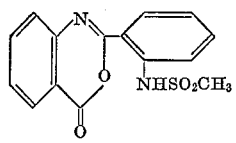

A solution of 45.7 g. (0.40 mole) methanesulfonyl chloride in 100 ml. pyridine was added dropwise to a solution of 27.4 g. (0.20 mole) anthranilic acid in 50 ml. pyridine at a temperature below 35° C. After 24 hours at ambient temperature, the precipitate was separated by filtration and washed with acetone. The product, after recrystallization from ethanol, melts at 212–213° C.

Calcd. for $C_{15}H_{12}N_2SO_4$ (percent): C, 56.95; H, 3.822; N, 8.86. Found (percent): C, 56.70; H, 3.98; N, 8.67.

EXAMPLE 6

Preparation of 2-(2-methanesulfonamidophenyl)-4(3H)-quinazolinone

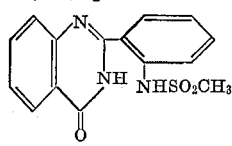

To a mixture of 150 ml. concentrated ammonium hydroxide and 25 ml. pyridine was added 3.7 g. 2-(2-methanesulfonamidophenyl)-4H-3,1-benzoxazin-4-one (product of Example 5) and 0.2 g. sodium hydroxide. The solution was refluxed for several hours, cooled and neutralized to pH 7.0 with dilute hydrochloric acid. The precipitate was separated by filtration, washed with water and dried. The product, after recrystallization from o-dichlorobenzene, melts at 283–284° C. and exhibits a solid state fluorescence peak at 500 nm.

Calcd. for $C_{15}H_{13}N_3SO_3$ (percent): C, 57.13; H, 4.15; N, 13.32. Found (percent): C, 57.21; H, 3.92; N, 13.22.

EXAMPLE 7

Preparation of 2-(2-benzamidophenyl)-4H-3,1-benzoxazin-4-one

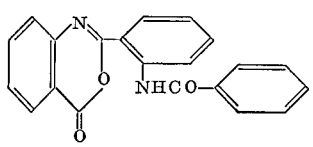

To a solution of 5.12 g. (0.02 mole) anthranilic acid in 25 ml. of pyridine was added 5.6 g. (0.04 mole) benzoyl chloride. After the exothermic reaction subsided, the solution was heated on a steam bath for 1 hour, cooled and filtered. The solid was washed with a 1:1 solution of hexane-acetone and dried in vacuo. The product melts at 170–171° C.

EXAMPLE 8

Preparation of 2-(2-benzamidophenyl)-4(3H)-quinazolinone

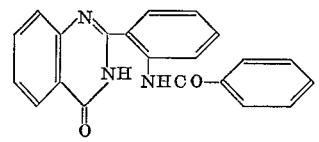

To a mixture of 250 ml. concentrated ammonium hydroxide and 50 ml. pyridine was added 3.0 g. 2-(2-benzamidophenyl)-4H-3,1-benzoxazin-4-one (product of Example 7). After 1 hour at 60° C. about 0.1 g. sodium hydroxide was added and the mixture is refluxed for 3 hours. The pH of the cooled mixture was adjusted to 8.0 with dilute hydrochloric acid. The precipitate was separated by filtration. When recrystallized from o - dichlorobenzene, the product melts at 316–318° C. and exhibits a solid state fluorescence peak at 540 nm.

Calcd. for $C_{21}H_{15}N_3O_2$ (percent): C, 73.88; H, 4.43; N, 12.31. Found (percent): C, 74.01; H, 4.33; N, 12.71.

EXAMPLE 9

Preparation of 2-[2-(2-naphthalenesulfonamido)phenyl]-4H-3,1-benzoxazin-4-one

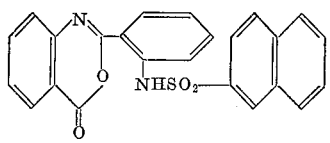

To a solution of 27.4 g. (0.20 mole) of anthranilic acid in 100 ml. pyridine was added a solution of 90.5 g. (0.40 mole) 2-naphthalenesulfonyl chloride in 170 ml. pyridine. The suspension was stirred overnight at ambient temperature. Approximately 200 ml. ethanol was added and the precipitate was separated by filtration, washed with ethanol and dried. After recrystallization from acetone and again from chloroform-hexane, the product melts at 194.5–195.5° C.

Calcd. for $C_{24}H_{16}N_2SO_4$ (percent): C, 67.27; H, 3.76; N, 6.54; S, 7.48. Found (percent): C, 67.14; H, 3.62; N, 6.33; S, 7.60.

EXAMPLE 10

Preparation of 2-[2-(2-naphthalenesulfonamido)phenyl]-4(3H)-quinazolinone

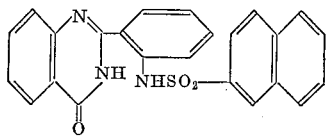

To a mixture of 40 ml. concentrated ammonium hydroxide and 10 ml. methyl Cellosolve was added 1.0 g. 2-[2-(2-naphthalenesulfonamido)phenyl] - 4H - 3,1-benzoxazin-4-one (product of Example 9) and 0.2 g. sodium hydroxide. The solution was refluxed for 12 hours, cooled and acidified with dilute acetic acid. The precipitate was separated by filtration, washed with water and dried. When recrystallized from o-dichlorobenzene, the product melts at 231–234° C. and exhibits a solid state fluorescence peak at 520 nm.

Calcd. for $C_{24}H_{17}N_3O_3S$ (percent): N, 9.82. Found (percent): N, 9.35.

EXAMPLE 11

Preparation of 6-chloro-2[2-(p-toluenesulfonamido)phenyl]-4H-3,1-benzoxazin-4-one

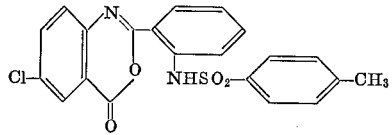

A solution of 18.8 g. p-toluenesulfonyl chloride in 50 ml. pyridine was added to a solution of 6.4 g. N-anthraniloyl-5-chloroanthranilic acid in 25 ml. pyridine, and the mixture was heated at 90° C. for 1 hour. The product, after recrystallization, melts at 191–200° C. and has the expected infrared spectral analysis.

EXAMPLE 12

Preparation of 6-chloro-2-[2-(ŗ-toluenesulfonamido)phenyl]-4(3H)-quinaxazolinone

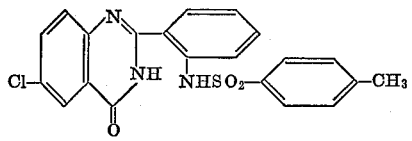

A mixture of 2.0 g. 6-chloro - 2 - [2-(p-toluenesulfonamido)phenyl]-4H-3,1-benzoxazin-4-one (product of Example 11), 25 ml. methyl Cellosolve and 50 ml. of concentrated ammonium hydroxide was stirred at 25° C. for 1 hour. After addition of 2.0 g. sodium hydroxide, the solution was refluxed for 2 hours. Cooling and acidification with dilute acetic acid provides a precipitate which, after purification by solution in dimethylformamide, treatment with charcoal and precipitation with water, melts at 291–294° C. (decomposition) and exhibits a solid state fluorescence peak at 525 nm.

Calcd. for $C_{21}H_{10}N_3O_3SCl$ (percent): C, 59.22; H, 3.78; N, 9.87. Found (percent): C, 59.34; H, 4.22; N, 9.64.

EXAMPLE 13

Preparation of 2-(2-acetamidophenyl)-4(3H)-quinazolinone

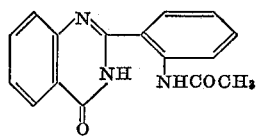

This compound was prepared from 2-(2-acetamidophenyl)-benzoxazinone (J. Pr. Chemie 80, 545) by reaction with ammonium hydroxide in accordance with the above-disclosed procedures. The product melts at 274–276° C. (decomposition) and exhibits a solid state fluorescence peak at 520 nm.

Examples 14–21

The procedure of Example 2 was followed substituting for the 2 - [2 - (p-toluenesulfonamido)phenyl]-4H-3,1-benzoxazin - 4 - one, equivalent amounts of the benzoxazinones shown in Table I. The corresponding 4(3)-quinazolinones were obtained.

Table I

Examples:     4H-3,1-benzoxazin-4-one
14 ____ 2-[2-(p-toluolylamino)phenyl]-
15 ____ 2-[2-(p-ethoxybenzamido)phenyl]-
16 ____ 2-[2-(p-methoxybenzenesulfonamido)phenyl]-
17 ____ 7-methyl-2-[2-(p-toluenesulfonamido)phenyl]-
18 ____ 6-methoxy-2-[2-(p-toluenesulfonamido)phenyl]-
19 ____ 2-[4-ethyl-2-(p-toluenesulfonamido)phenyl]-
20 ____ 2-[5-methoxy-2-(p-toluenesulfonamido)phenyl]-
21 ____ 2-[4-chloro-2-(p-toluenesulfonamido)phenyl]-

EXAMPLE 22

A transparent offset ink base was prepared by mixing 61 parts of offset ink varnish, 6 parts of polyethylene wax compound, 3.0 parts of dryers and additives. Luminescent inks were prepared by milling the ink base with between 5% and 30% of the luminescent compounds of Examples 2, 4, 6, 8 and 10 and, when less than 30% of luminescent compound is used, sufficient alumina hydrate to make a total of 30% of luminescent compound and alumina hydrate. The products were dispersions of luminescent compounds in the ink base.

When the inks were printed upon white paper the marks were invisible in ordinary light. When irradiated with ultraviolet light, the marks were visible because of the fluorescence of the luminescent compound dispersed in the ink vehicle. The ink marks fluoresce in the visible region of the spectrum.

I claim:
1. A compound of the formula:

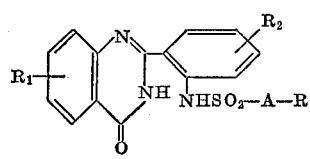

wherein R is hydrogen, alkyl of 1–4 carbons or alkoxy of 1–4 carbons; $R_1$ and $R_2$ are hydrogen, alkyl of 1–4 carbons, alkoxy of 1–4 carbons or halogen; and A is alkylene of 1–18 carbons, phenylene or naphthylene.

2. 2[2 - (p - toluenesulfonamido)pheny]-4(3H)-quinazolinone, as in claim 1.

3. 2 - (2-benzenesulfonamidophenyl)-4(3H)-quinazolinone, as in claim 1.

4. 2 - (2-methanesulfonamidophenyl)-4(3H)-quinazolinone, as in claim 1.

5. 2 - [2 - (2-naphthalenesulfonamido)phenyl]4(3H)-quinazolinone, as in claim 1.

6. 6 - chloro - 2-[2-(p-toluensulfonamido)phenyl]4-(3H)-quinazolinone, as in claim 1.

No references cited.

ALEX MAZEL, Primary Examiner

R. J. GALLAGHER, Assistant Examiner

U.S. Cl. X.R.

260—244 R, 256.4 Q, 518 R; 252—301.2; 106—21